United States Patent
Lobo et al.

(10) Patent No.: US 11,150,716 B2
(45) Date of Patent: Oct. 19, 2021

(54) DYNAMICALLY OPTIMIZING MARGINS OF A PROCESSOR

(71) Applicant: INTERNATIONAL BUSINESS MACHINES CORPORATION, Armonk, NY (US)

(72) Inventors: Preetham M. Lobo, Bangalore (IN); Pradeep Bhadravati Parashurama, Bhadravati (IN); Tobias Webel, Schwaebisch-Gmuend (DE); Ramon Betran Monfort, New York, NY (US); Alper Buyuktosunoglu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/782,386

(22) Filed: Feb. 5, 2020

(65) Prior Publication Data
US 2021/0240247 A1 Aug. 5, 2021

(51) Int. Cl.
G06F 1/3206 (2019.01)
G06F 1/3296 (2019.01)
G06F 9/30 (2018.01)
G06F 1/324 (2019.01)
G06F 9/48 (2006.01)

(52) U.S. Cl.
CPC ............ *G06F 1/3206* (2013.01); *G06F 1/324* (2013.01); *G06F 1/3296* (2013.01); *G06F 9/3017* (2013.01); *G06F 9/4881* (2013.01)

(58) Field of Classification Search
CPC .... G06F 13/3206; G06F 1/324; G06F 1/3296; G06F 9/3017; G06F 9/4881
USPC ........................................................ 713/320
See application file for complete search history.

(56) References Cited

U.S. PATENT DOCUMENTS

| | | | |
|---|---|---|---|
| 5,907,670 A * | 5/1999 | Lee .................... | H04L 41/0604 714/4.1 |
| 7,720,621 B2 | 5/2010 | Weekly | |
| 8,941,426 B1 * | 1/2015 | Drake .............. | G01R 31/31725 327/198 |
| 9,164,563 B2 * | 10/2015 | Berry, Jr. .................. | G06F 1/28 |
| 9,798,375 B1 * | 10/2017 | Becker .................. | G06F 1/3206 |
| 10,171,081 B1 | 1/2019 | Bose et al. | |
| 2005/0251700 A1 * | 11/2005 | Henderson ............ | G06F 1/3203 713/401 |
| 2009/0313631 A1 * | 12/2009 | De Marzo ............. | G06F 9/5038 718/103 |

(Continued)

OTHER PUBLICATIONS

Ramon Bertran, Alper Buyuktosunoglu, Pradip Bose, Timothy J. Slegel, Gerard Salem, Sean M. Carey, Richard F. Rizzolo, Thomas Strach "Voltage Noise in Multi-Core Processors: Empirical Characterization and Optimization Opportunities". Micro 2014: 368-380 (3 Pages).

(Continued)

*Primary Examiner* — Paul R. Myers
(74) *Attorney, Agent, or Firm* — Griffiths & Seaton PLLC (57) ABSTRACT

Various embodiments are provided for providing optimized margins of processors in a computing environment. Margins of voltage, frequency, or a combination thereof may be dynamically monitored and adjusted for a executing a processor based a workload scheduled during an event.

15 Claims, 9 Drawing Sheets

(56) References Cited

U.S. PATENT DOCUMENTS

| | | | | |
|---|---|---|---|---|
| 2010/0125436 | A1* | 5/2010 | Chase | G06F 11/24 702/186 |
| 2012/0005513 | A1* | 1/2012 | Brock | G06F 1/324 713/340 |
| 2012/0166854 | A1* | 6/2012 | Rotem | G06F 1/28 713/340 |
| 2012/0254641 | A1* | 10/2012 | Rotem | G06F 11/3024 713/320 |
| 2012/0330616 | A1* | 12/2012 | Berry | G06F 11/24 702/186 |
| 2013/0212410 | A1* | 8/2013 | Li | G06F 1/263 713/300 |
| 2014/0025991 | A1* | 1/2014 | Anandavally | G06F 11/0724 714/10 |
| 2014/0028364 | A1* | 1/2014 | Venkatraman | G06F 1/206 327/262 |
| 2014/0237302 | A1* | 8/2014 | Berry, Jr. | G06F 1/206 714/47.1 |
| 2014/0281629 | A1* | 9/2014 | Bose | G06F 1/3228 713/323 |
| 2015/0095089 | A1* | 4/2015 | Ginis | G06Q 10/0637 705/7.22 |
| 2015/0149620 | A1* | 5/2015 | Banerjee | G06F 9/5083 709/224 |
| 2015/0170716 | A1* | 6/2015 | Lucas | G11C 29/028 365/226 |
| 2015/0192942 | A1* | 7/2015 | Smith | G05F 1/462 327/540 |
| 2017/0068309 | A1* | 3/2017 | Toosizadeh | G06F 1/3206 |
| 2017/0147058 | A1* | 5/2017 | Bertran | G06F 1/3296 |
| 2017/0177064 | A1* | 6/2017 | Christensen | G06F 9/3836 |
| 2020/0174542 | A1* | 6/2020 | Rao | G06F 1/324 |
| 2021/0011764 | A1* | 1/2021 | Kelly | G06F 9/4893 |

OTHER PUBLICATIONS

Tobias Webel, P. M. Lobo, Ramon Bertran, Gerard Salem, Malcolm Allen-Ware, Richard F. Rizzolo, Sean M. Carey, Thomas Strach, Alper Buyuktosunoglu, Charles Lefurgy, Pradip Bose, Ricardo Nigaglioni, Timothy J. Slegel, Michael S. Floyd, Brian W. Curran "Robust power management in the IBM z13". IBM Journal of Research and Development 59 (4/5) (2015) (12 Pages).

Pierce I-Jen Chuang, Christos Vezyrtzis, Divya Pathak, Richard F. Rizzolo, Tobias Webel, Thomas Strach, Otto A. Torreiter, Preetham Lobo, Alper Buyuktosunoglu, Ramon Bertran, Michael S. Floyd, Malcolm S. Ware, Gerard Salem, Sean M. Carey, Phillip Restle: "26.2 Power supply noise in a 22nm z13™ microprocessor." ISSCC 2017: 438-439.

Christos Vezyrtzis, Thomas Strach, Pierce I-Jen Chuang, Preetham Lobo, Richard F. Rizzolo, Tobias Webel, Pawel Owczarczyk, Alper Buyuktosunoglu, Ramon Bertran, David T. Hui, Susan M. Eickhoff, Michael S. Floyd, Gerard Salem, Sean M. Carey, Stelios G. Tsapepas, Phillip J. Restle: "Droop mitigation using critical-path sensors and an on-chip distributed power supply estimation engine in the z14™ enterprise processor". ISSCC 2018: 300-302.

Christopher J. berry, David Wolpert, unnstos vezrytzis, Richard F. Rizzolo, bean M. Carey, Yamv Maroz, Hunter F. Shi, Dureseti Chidambarrao, Christian Jacobi, Anthony Saporito, Thomas Strach, Alper Buyuktosunoglu, Preetham Lobo, Pierce Chuang, Pawel Owczarczyk, Ramon Bertran, Tobias Webel, Phillip J. Restle: "IBM z14: Processor Characterization and Power Management for High-Reliability Mainframe Systems." J. Solid-State Circuits 54(1) 121-132(2019).

\* cited by examiner

THROTTLE PATTERNS TO ACHIEVE A THROTTLE LEVEL

| THROTTLE % | THROTTLE PATTERN |
|---|---|
| 0 | 0000000000000000 |
| 6.25 | 1000000000000000 |
| 12.5 | 1000000010000000 |
| 18.75 | 1100000010000000 |
| 25 | 1100000011000000 |
| 31.25 | 1110000011000000 |
| 37.5 | 1110000011100000 |
| 43.75 | 1111000011100000 |
| 50 | 1111000011110000 |
| 56.25 | 1111100011110000 |
| 62.5 | 1111100011111000 |
| 68.75 | 1111110011111000 |
| 75 | 1111110011111100 |
| 81.25 | 1111111011111100 |
| 87.5 | 1111111011111110 |
| 93.75 | 1111111111111110 |
| 100 | 1111111111111111 |

DYNAMICALLY OPTIMIZING MARGINS OF A PROCESSOR

BACKGROUND OF THE INVENTION

Field of the Invention

The present invention relates in general to computing systems, and more particularly to, various embodiments for providing dynamically optimized margins of processors in a computing environment by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for providing optimized margins of processors in a computing environment are provided. In one embodiment, by way of example only, a method for providing optimized margins of processors in a computing environment, again by a processor, is provided. Margins of voltage, frequency, or a combination thereof may be dynamically monitored and adjusted for a executing a processor based a workload scheduled during an event.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present invention relates generally to the field of computer system performance adaption. More specifically, the present application is directed to providing dynamically optimized margins of processors in a multi-core processing system.

Computer systems can dynamically adjust voltage and frequency settings during execution as part of power management. As one example, dynamic voltage and frequency scaling (DVFS) can be applied to scale voltage and frequency for a processor as part of power management. Typically, a processor that is idling without a workload can operate at a reduced power level achieved by adjusting voltage and/or frequency. However, altering voltage and/or frequency can increase susceptibility to noise events that may impact system reliability. Conversely, operating at a much higher power level than needed reduced power efficiency of the system. Additionally, within a computer system, margins (e.g., "guard band") of the voltage and/or frequency for robust computing operations in today's processor design change over time. Typically, at the early stage of a processor's lifetime, margins on aging and noise are not required to be as high as the margins in the later stages of the lifetime of the processor.

Thus, to overcome this challenge, the present invention provides a novel solution by providing dynamically optimized margins of processors in a computing environment are provided. In one embodiment, by way of example only, the margins of voltage, frequency, or a combination thereof may be dynamically monitored and adjusted for a executing a processor based a workload scheduled during an event. That is, the present invention leverages noise stress marks during a "bring-up operation" (e.g., initialize) to calibrate different sensors, adjust voltage and frequency margins. Once the margins may be defined (e.g., via an administrator, machine learning, manufacturer, or other source, etc.), the margins may be used throughout the lifetime of a processor For example, for various computing systems, calibration may be used for critical path monitor ("CPM") sensors in conjunction with "worst case" conditions to identify the minimum voltage ("$V_{min}$") point prior the computing systems are delivered to a customer. For example, in one aspect, the computing systems may be executed beyond a defined "operational range" (e.g., a safe range) where the frequency may be increased above a defined normalcy threshold (e.g., beyond its nominal point) such as, for example, 5.8 gigahertz ("GHz") rather than that of 5.5 GHz. In this way, dynamically monitoring margins provided for operational stability of the computing system throughout the life a processor.

In an additional aspect, the present invention may generate/execute one or more systems tests to determine/check the operational stability of a processor, where the present invention is triggered dynamically upon deploying and activating the computing systems (e.g., the system test may be activated after the computer system is activated and deployed at a customer's location).

In one aspect, the margins may be dynamically monitored, determined, and/or adjusted based on various configurable conditions such as, for example, aging, temperature, and the like, the margins of the processors and/or the computing system in a customer environment. One or more system tests may be periodically executed and performed as background operations so as provide minimal and/or no impact on computing performance. One or more selected processor cores in a multi-core environment (e.g., non-licensed cores) may be used and spare cycles may be leveraged due to input/output ("I/O"), memory accesses, and/or workload idleness. The granularity of the system test runs may be configurable (e.g., as long as a day/month/quarter/year) to avoid any possible/significant performance hit. In this way, computing hardware may be shipped to customer without the extra voltage and/or frequency margins needed for aging (e.g., lower voltage yields less power and increases cost, or higher frequency yields increase processor performance). Also, a reduction in the voltage and/or frequency margin, which may be caused from aging or other factor, may be detected and corrective action may be implemented such as, for example, by adjusting the voltage, frequency, and/or a combination thereof for the processor.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best applications, programs, and/or computing components.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
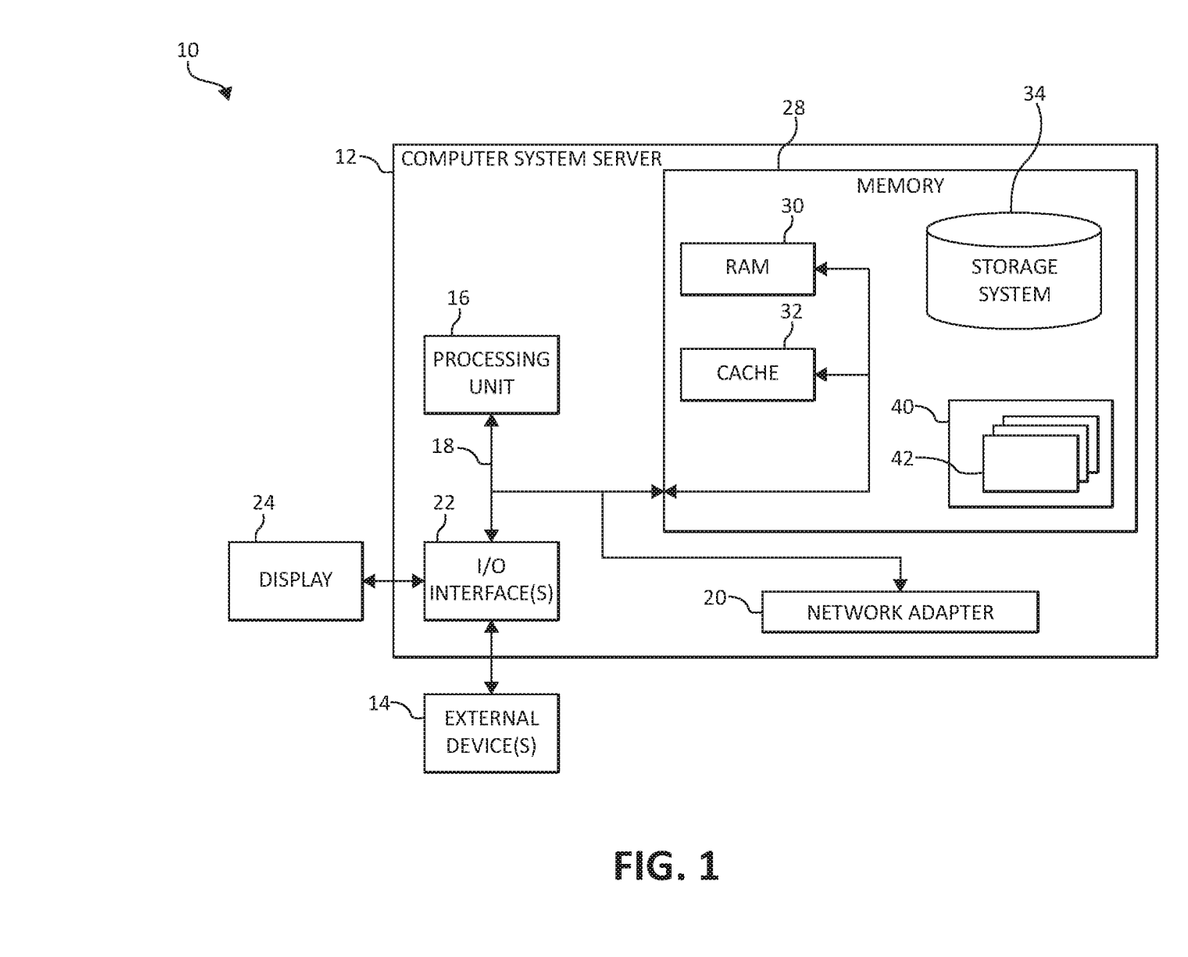
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
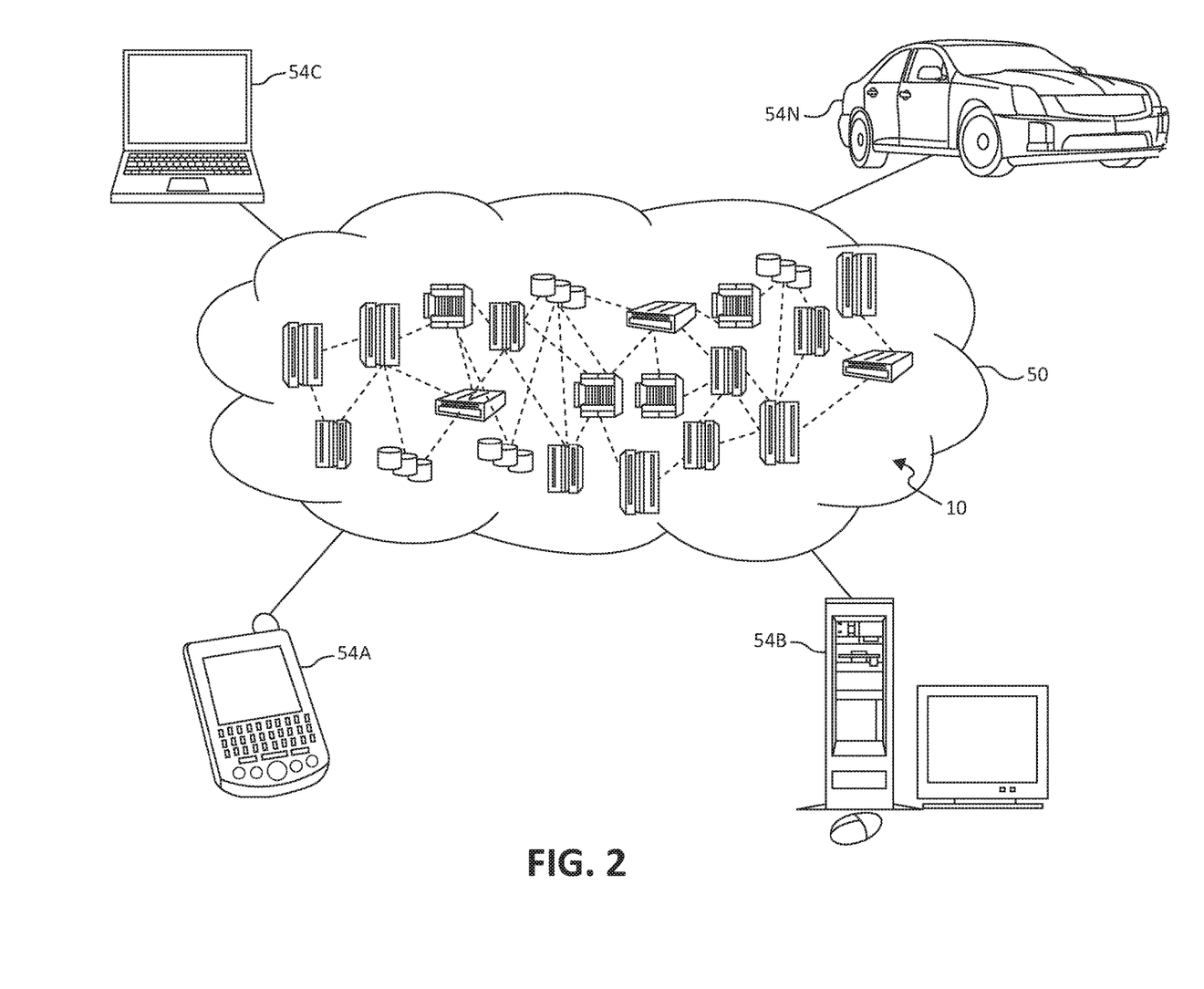
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
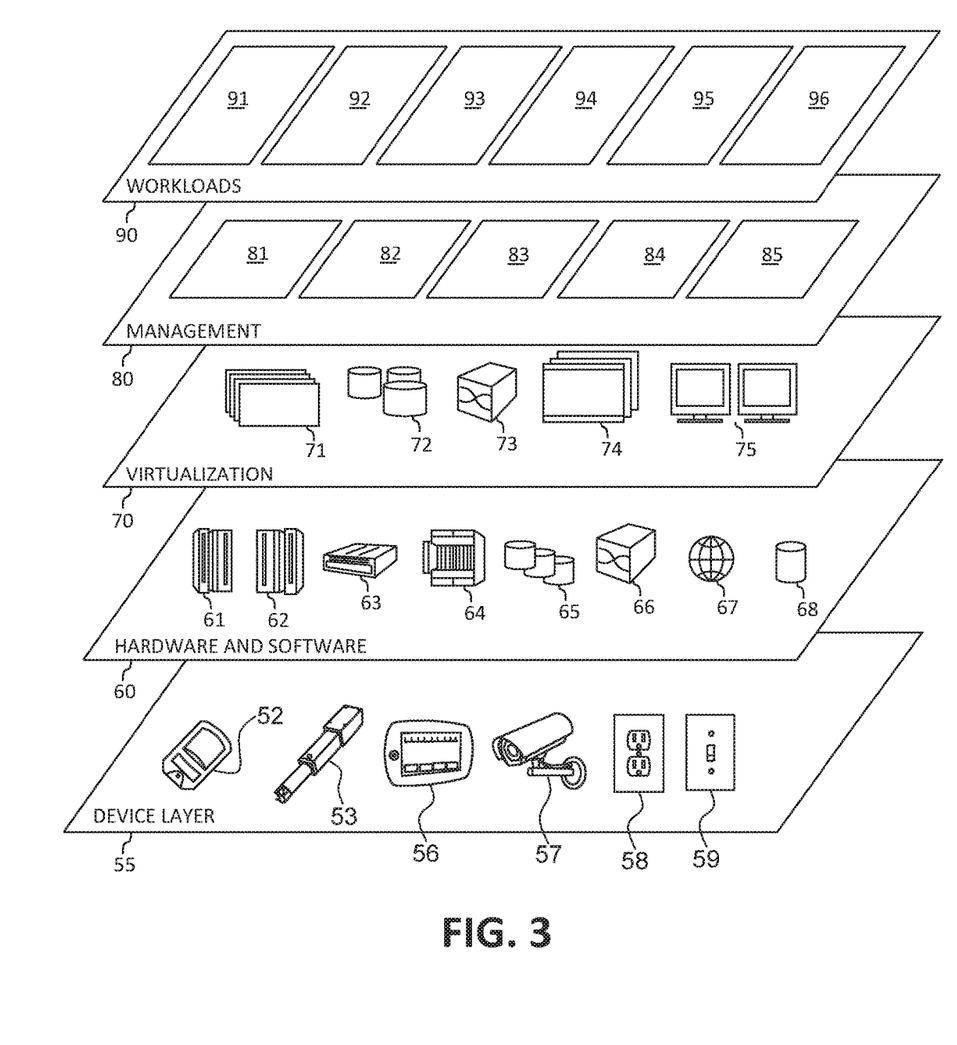
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing dynamically optimized margins of processors. In addition, workloads and functions 96 for providing dynamically optimized margins of processors may include such operations as data analytics, data analysis, and as will be further described, memory allocation functionality. One of ordinary skill in the art will appreciate that the workloads and functions 96 for providing dynamically optimized margins of processors may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
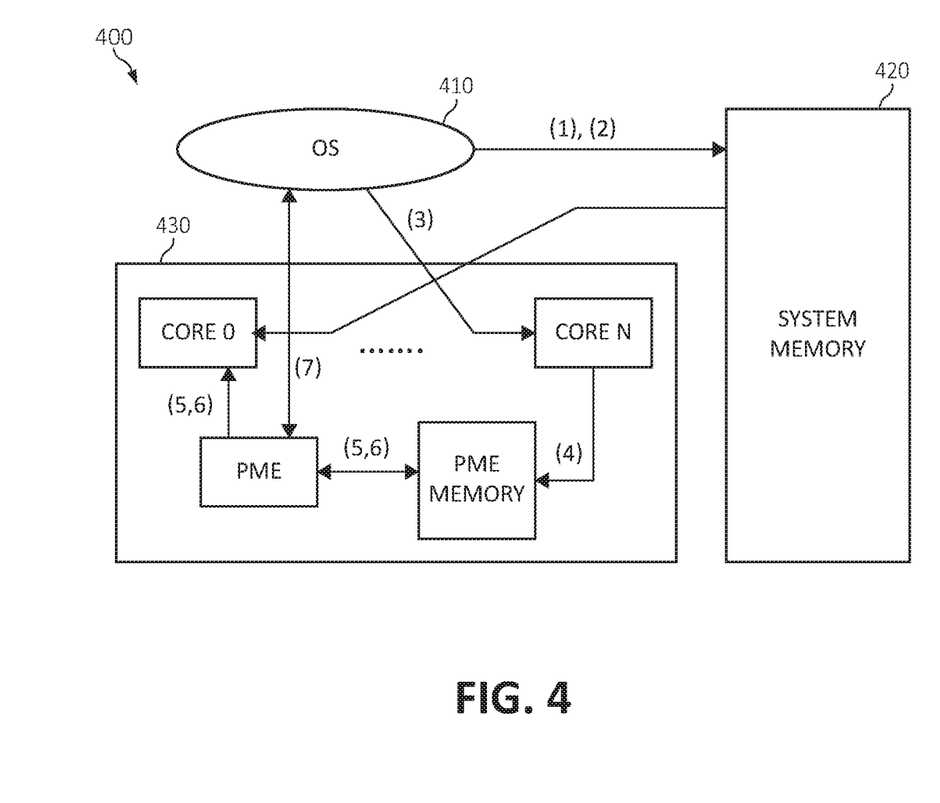
FIG. 4 is an additional block diagram depicting an architecture for providing optimized margins of processors in a computing environment in which aspects of the present invention may be realized.

Turning now to FIG. 4, a block diagram depicts a system architecture 400 for providing optimized margins of processors in a computing environment in which illustrative embodiments may be implemented. In one aspect, one or more of the components, modules, services, applications, and/or functions described in FIGS. 1-3 may be used in FIG. 4. For example, the system architecture 400 may be components that may be incorporated, controlled, accessed, managed, and/or included in a computer system/server 12 of FIG. 1. In one aspect, repetitive description of like elements, components, modules, services, applications, and/or functions employed in other embodiments described herein (e.g., FIGS. 1-3) is omitted for sake of brevity.

As illustrated, the system architecture 400 may include an external memory 410, an operating system ("OS") 410, a memory 420 (e.g., a system memory), and a multi-core system 430. In one aspect, the multi-core system 430 may include a plurality of processor cores such as, for example, core 0-N, a power management engine ("PME"), and a scratchpad (e.g., a PME memory).

In operation, as depicted in step 1), the OS 410 (e.g., an OS manager) may periodically schedule a system maintenance event. The decision by the OS 410 to schedule the system maintenance event may be made based on set of configurable conditions (e.g., time of day, system utilization, idleness periods, time since last run, etc.)

In step 2) the OS 410 may prepare a workload o be executed during the system maintenance event in the memory 420 and assigns the workload to a group of cores (e.g., cores 0-N), which will participate in the testing of the system maintenance event.

In step 3), the OS 410 OS may trigger a millicode routine (e.g., via an implementation specific instruction). In one aspect, millicode may be a higher level of microcode used to implement an instruction set of a computer. Millicode may execute on top of the microcoded instructions and uses those instructions to implement more complex instructions visible to the user of the system. In one aspect, by way of example only, the implementation of millicode may require a special processor mode called "millimode" that may, by way of example only, provide its own set of registers, and own special instructions invisible to a user.

In step 4), the millicode routine sets a flag in the scratchpad memory of the PME (e.g., where the PME may be an on-chip micro-controller) with the following information. That is, the set flag in the scratchpad memory may indicate a) those cores of the group cores are required to participate, and/or b) parameters related to behavior of a throttle system center operations manager ("scom") (e.g., cycles between enable/disable throttle-scom, duration, etc.)

In step 5), the PME determines/checks the scratchpad memory at selected time intervals (e.g., every 16 ms. If the system maintenance event is set, the PME issues throttle-scom to the respective cores using on or more of the specified parameters. During the system maintenance event, the CPM may be read and a minimum CPM value bin for each of the cores (e.g., cores 0-N) may be stored in the scratchpad memory.

In step 6), when the PME identifies (e.g., finds) and/or learns that the system maintenance event has been cleared by the millicode routine, the PME disables the throttle-SCOM. The PME may compares the minimum CPM value (e.g., minimum CPM value bin) for each core stored during the system maintenance event and if the minimum CPM value bin is below a configurable CPM threshold, the PME may notifies the OS 410 that the margins (e.g., voltage margin, frequency margin, or both) have been reduced In step 7), the OS 410 (e.g., the application/software layer) may then decide to increase a margin (e.g., increasing voltage or reducing frequency), or decommission one or more of the cores (e.g., core 0-N). It should be noted that the OS 410 may refer to a lowest application/software layer responsible (e.g., in charge of) for a CPU resource (e.g., a hypervisor, millicode, firmware, etc.). The workload running on the core(s) may be a customer application (so as to adjust/tailor margins to real-usage activity) and/or a predefined steady-state workload such as, for example, a power-virus (so as to adjust/tailor margins to worst-case activity).

Figure 5:
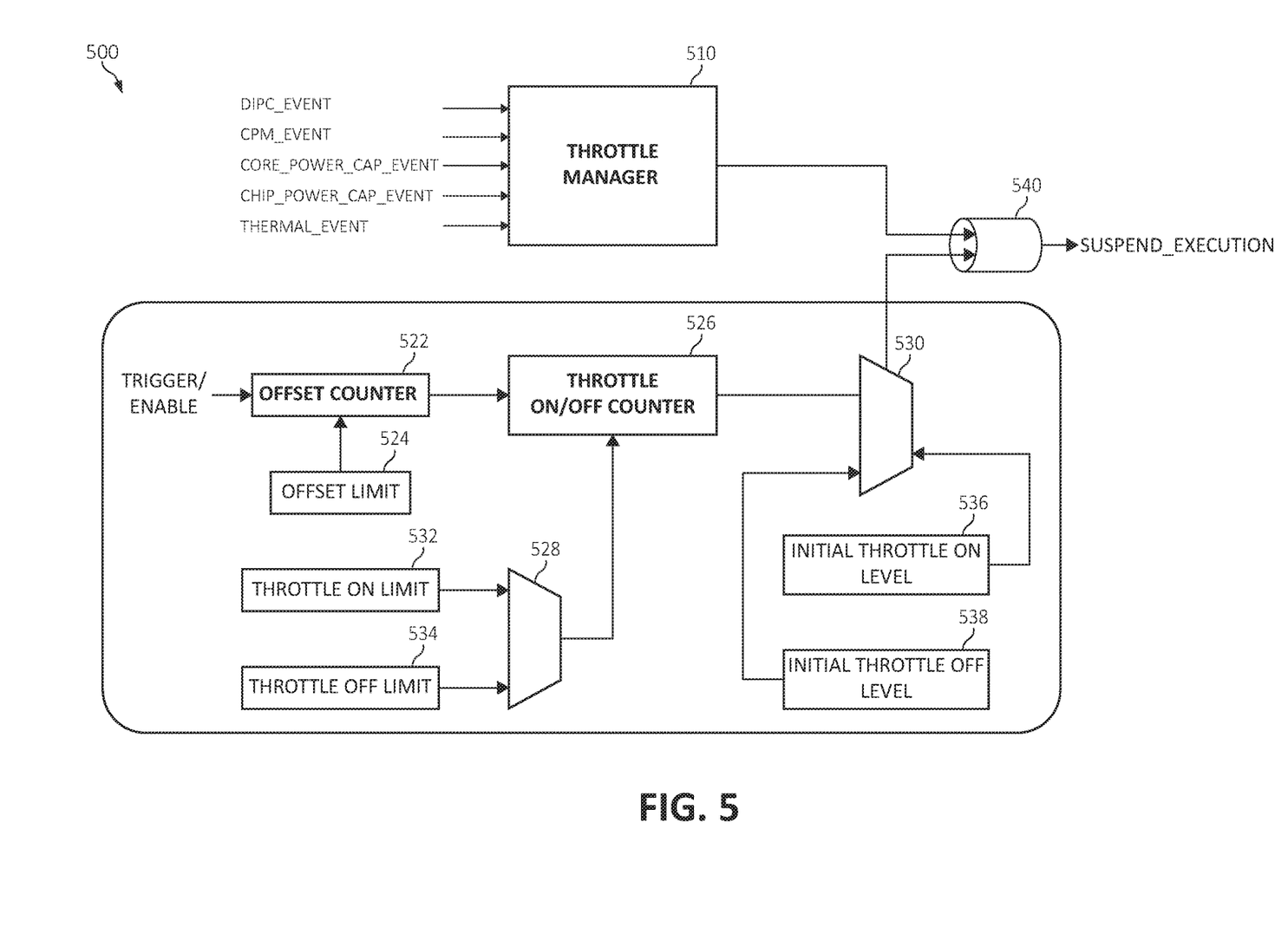
FIG. 5 is an additional block diagram depicting an architecture for providing optimized margins of processors in a computing environment in which aspects of the present invention may be realized.

Turning now to FIG. 5, a block diagram depicts a throttle-scom system architecture 500 (e.g., hardware logic architecture/a throttle-scom) for providing optimized margins of processors in a computing environment in which illustrative embodiments may be implemented. In one aspect, one or more of the components, modules, services, applications, and/or functions described in FIGS. 1-4 may be used in FIG. 5. For example, the system architecture 500 may be components that may be incorporated, controlled, accessed, managed, and/or included in a computer system/server 12 of FIG. 1. In one aspect, repetitive description of like elements, components, modules, services, applications, and/or functions employed in other embodiments described herein (e.g., FIGS. 1-4) is omitted for sake of brevity.

As depicted, the throttle-scom system architecture 500 may include a throttle manager 510, an offset counter 522, a throttle on/off counter 526, and/or one or more components such as, for example component 528 and component 530.

As a preliminary matter, the noise tests are crucial for margin detection. The noise tests can be easily created by throttling and un-throttling a power-virus instead of having separate noise benchmarks. A throttle/un-throttle operation may be performed by a throttle-scom (e.g., a special purpose register) write, but this scom write is required to be triggered by firmware ("FW"). A self-boot engine ("SBE") FW is un suitable since the program of SBE FW will be in continuous operation and firmware support packages ("FSP") FW is too slow.

Thus, as depicted in FIG. 5, a throttle-scorn system architecture 500 is provided by implementing a throttle on/off cycle counter 526, which executes throttle cycles and un-throttle cycles (e.g., throttle off cycles). The throttle on and throttle off cycles may be programmable. In one aspect, the throttle on/off cycle counter 526 may be 14-bit counter that may provide programmability such as, for example, from 0.179 nanoseconds ("ns") to 91.5 micro seconds ("us") at 5.6 GHz (worst case scenario) and 0.200 ns to 81.9 us at 5.0 GHz, which may apply to high frequency ("HF"), medium frequency ("MF") and low frequency ("LF") noise scenarios, where HF, MF, and LF noise scenarios may be predetermined, predefined, learned, and/or each be within a selected range.

In an additional aspect, the offset counter 522 may be a 7-bit offset counter, which when programmed may offset a start of the throttle on/off loop. The component 528 and 530 may be 14-bit latches to store throttle on and throttle off cycle limits. It should be noted that the hardware logic of the throttle-scorn system architecture 500 may be deployed during a "bring-up" operation for first time calibration. For example, based on extensive analysis, the present invention may provide various distinct power supply noise benchmarks such as, for example, with the following throttle on/throttle off durations: 76.8 ns/76.8 ns, 76.8 ns/768 ns, 76.8 ns/7680 ns, 768 ns/6.8 ns, 768 ns/768 ns, 768 ns/7680 ns, 7680 ns/76.8 ns, 7680 ns/768 ns, 7680 ns/7680 ns, 19.2 ns/19.2 ns, 192 ns/192 ns, and 1920 ns/3840 ns. This provides coverage across a wide range (e.g., mid to low frequency) of power-noise distribution. In one aspect, during manufacturing testing and by way of example only, each of the processors run a noise stress mark with CPM throttling enabled at the nominal frequency and a voltage bias range from nominal to nominal minus 3% bias at a water temperature of 35° C.

In operation of the throttle-scom system architecture 500, may trigger/enable the start of the throttle on/off loop for the offset counter 522 with an offset limit 524 provided/used by the offset counter 522. The throttle on/off cycle counter 526 may execute a throttle on cycle and un-throttle cycles based on upon received input from the component 528 providing as the input either the throttle on limit 532 or the throttle off limit 534. The throttle on and throttle off cycles may vary based on the throttle on limit 532 or the throttle off limit 534. In one aspect, component 530 may receive an initial throttle on level 536 or an initial throttle off level 538 along with input from the throttle on/off counter 526 indicating to either the throttle on limit or the throttle off limit.

The output of component 530 may be feed into the component 540, which may also receive information from the throttle manager 510, which information may be information relating to various scheduled maintenance events such as, for example, a DIPC event, a CPM event, a core power cap event, a chip power cap event, or a thermal event. The component 540 may then suspend execution.

Figure 6:
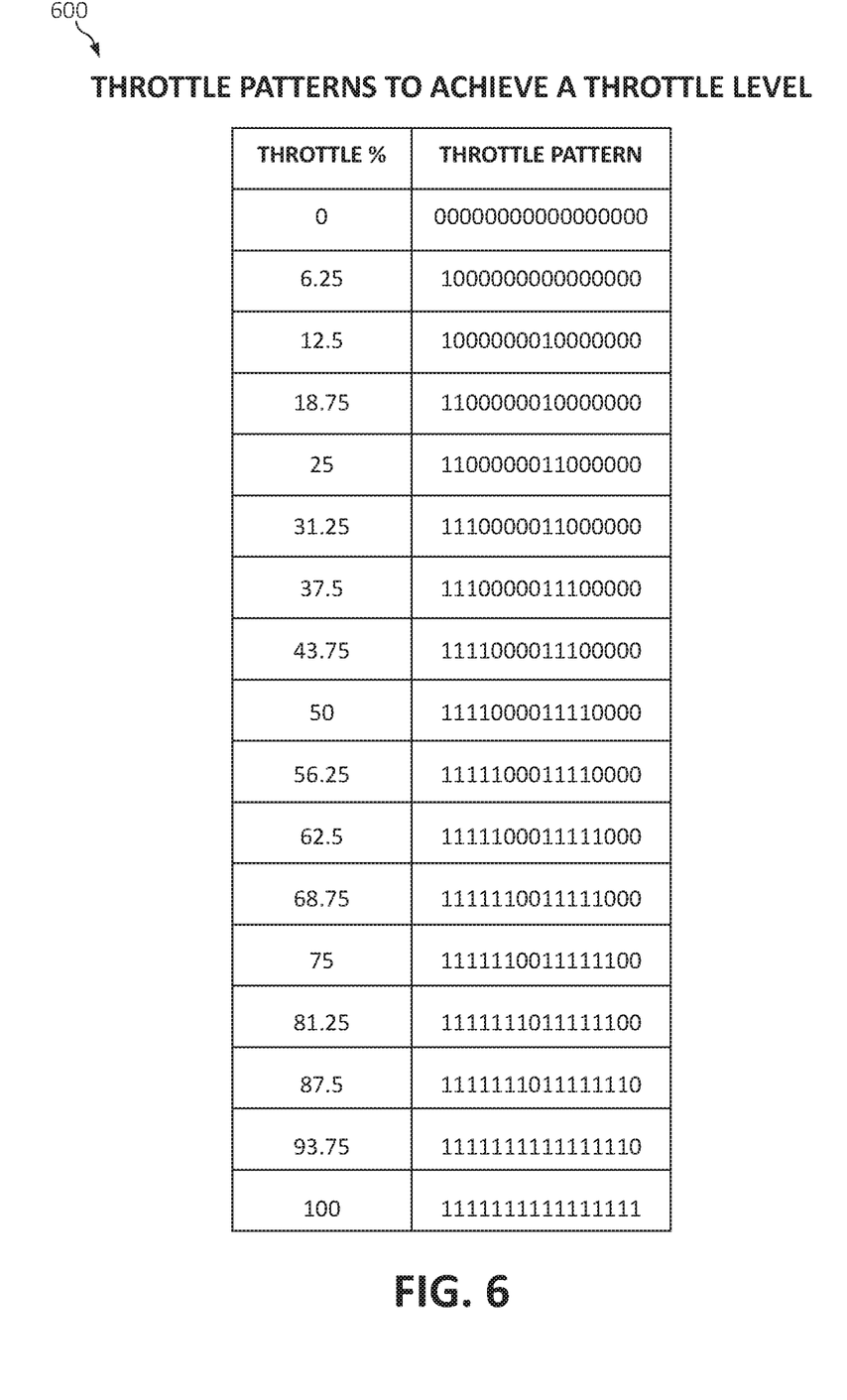
FIG. 6 is a table diagram depicting exemplary throttle patterns to achieve a throttle level for providing optimized margins of processors in which aspects of the present invention may be realized.

Turning now to FIG. 6, table diagram 600 depicting exemplary throttle patterns to achieve a throttle level for providing optimized margins of processors. For example, by way of example only, the first column may indicate a percentage of throttling on or throttle off level. The second column may indicate, for example, the observed throttle pattern. Each row depicts the observed throttle patterns to achieve a throttle level. A "0" may indicate to enable execution (e.g., "ON") and a "1" may indicate to slow the throttle level (e.g., apply a breaking operation or "OFF") in a 16 cycle processor cycle. Thus, each processor cycle may have a "0" or a "1" to indicate to adjust the throttle level. For example, 50% throttle cycle indicates 4 cycles of "1's" and 4 cycles of "O's" which are then repeated again.

Figure 7A:
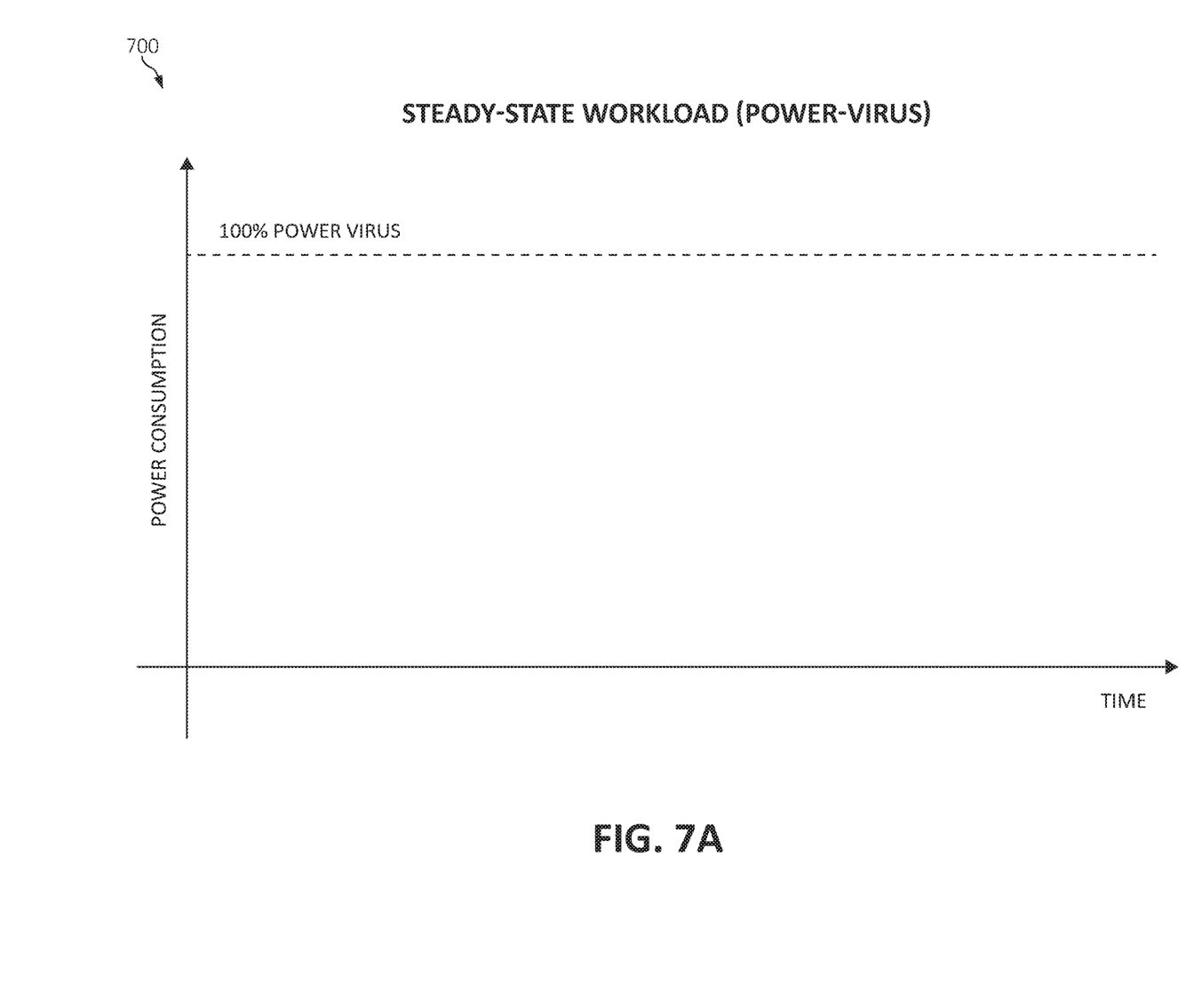
FIG. 7A is a diagram depicting exemplary steady-state workloads for providing optimized margins of processors in which aspects of the present invention may be realized.

Turning now to FIG. 7A, graph 700 depicts a steady-state workloads for providing optimized margins. On the Y-axis is the power consumption level and the X-axis indicates the amount of time. As depicted in FIG. 7A, a 100% workload (e.g., a power virus workload) is show in steady state over a selected period of time. That is, a 100% workload indicates that the processor is working at 100% (e.g., maximum workload of the processor core).

Figure 7B:
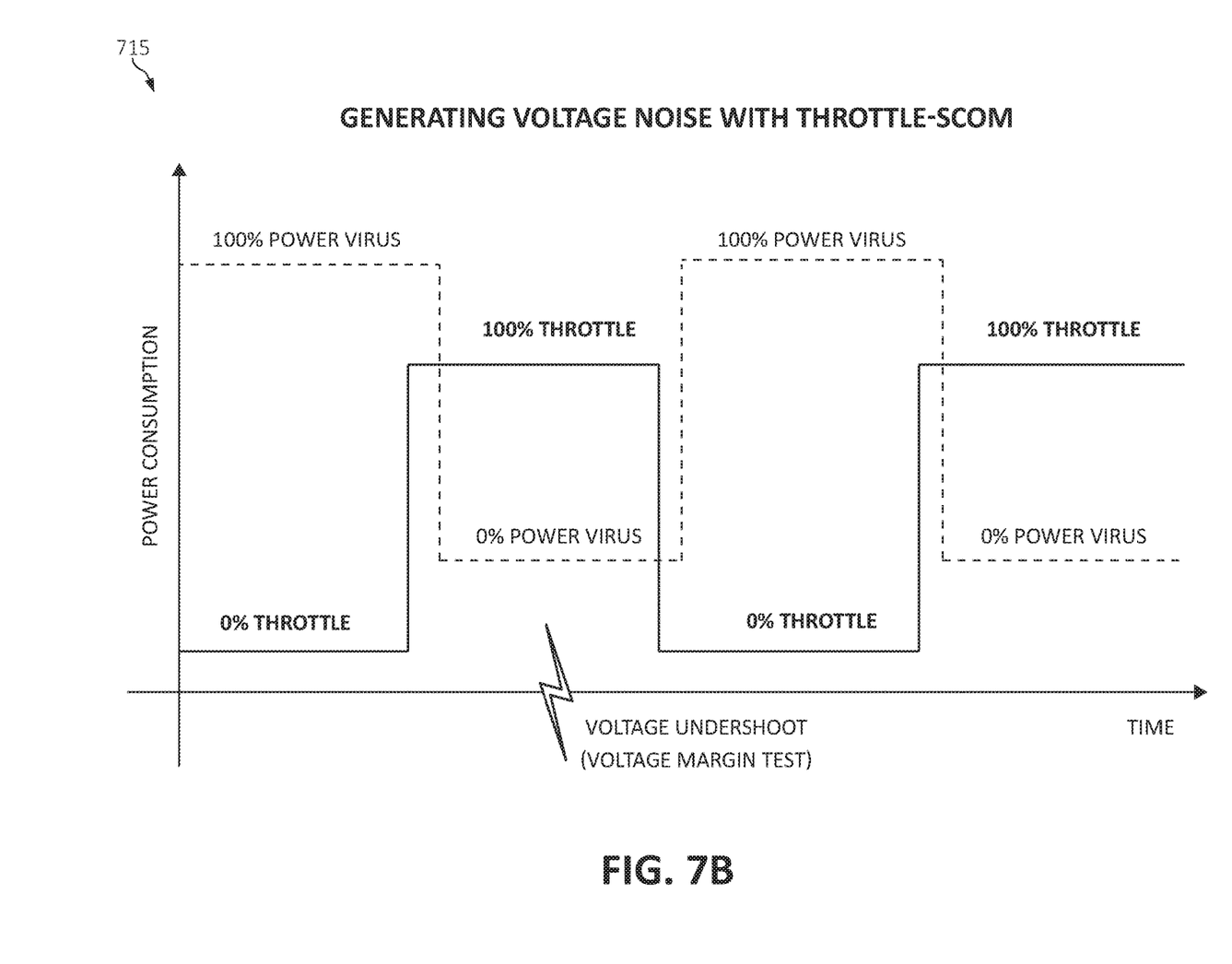
FIG. 7B is a diagram depicting exemplary operations for generating voltage noise with throttle-scom for providing optimized margins of processors in which aspects of the present invention may be realized.

However, in contrast, graph 715 of FIG. 7B depicts the operations for generating voltage noise with throttle-scom for providing optimized margins of processors. That is, at a 100% workload (e.g., a power virus workload), the amount of throttle is at 0%. Alternatively, when the amount of the workload (e.g., a power virus workload) is reduced such as, for example, reducing the workload to 0% the throttle cycle amount is raised to 100%. Thus, as the amount of throttling is increased the amount of the processor core is reduced.

Figure 8:
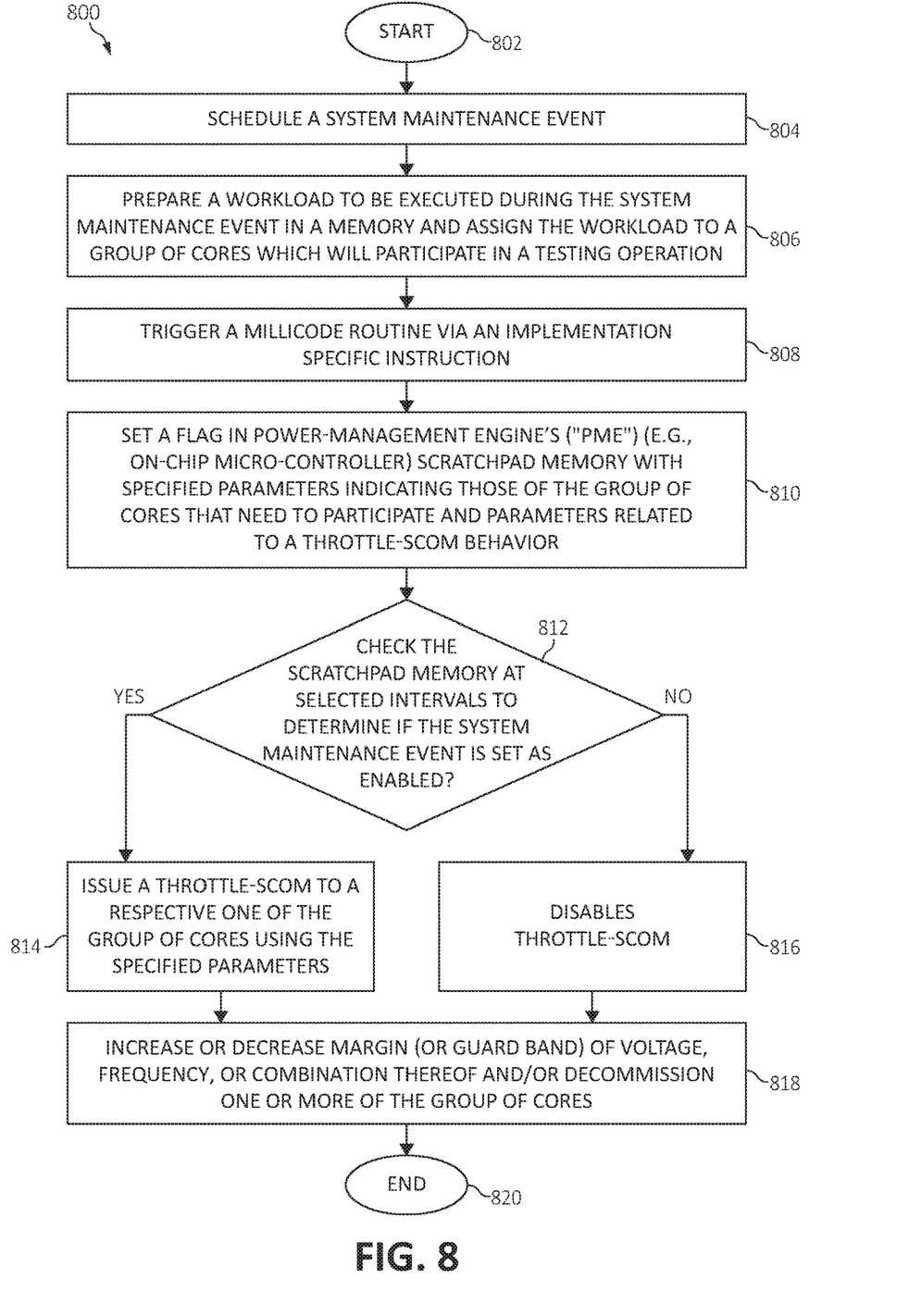
FIG. 8 is a flowchart diagram depicting an additional exemplary method for providing dynamically optimized margins of processors in a computing environment by a processor, again in which aspects of the present invention may be realized.

Turning now to FIG. 8, an additional method 800 for providing dynamically optimized margins of processors in a computing environment by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

A system maintenance event may be scheduled (e.g., for one or more processors), as in block 804. A workload may be prepared to be executed during the system maintenance event in a memory and the workload may be assigned to a group of cores (e.g., processor cores) which will participate in a testing operation, as in block 806. A millicode routine may be triggered via an implementation specific instruction, as in block 808. A flag may be set in a power management ("PME") (e.g., an on-chip micro-controller) scratchpad memory with specified parameters indicating those of the group of cores that need (e.g., required) to participate and parameters related to a throttle-scom behavior, as in block 810.

A determination operation may be performed to determine/check the scratchpad memory at selected intervals (e.g., time intervals) to determine if the system maintenance event is set as enabled, as in block 812. If yes at block 812, a throttle-scom may be issued to a respective one of the group of cores using the specified parameters, as in block 814. If no at block 812, the throttle-scom may be disabled, as in block 816.

From both blocks 814 and 816, a margin (e.g., guard band) of voltage, frequency, or combination thereof may be increased and/or decreased and/or one or more of the group of cores may be decommissioned, as in block 818. The functionality 800 may end, as in block 810.

In one aspect, in conjunction with and/or as part of at least one block of FIG. 8, the operations of method 800 may include each of the following. The operations of method 800 may dynamically monitor and adjust margins of voltage, frequency, or a combination thereof for a executing a processor based a workload scheduled during an event. The operations of method 800 may schedule the event based on one or more configurable conditions.

The operations of method 800 may perform the event as a background operation, wherein the event is a system maintenance event. The operations of method 800 may assign the workload to one or more processor cores participating in the event. The operations of method 800 may trigger a millicode routine to execute. The millicode routine may indicate both those of a group of processor cores required to participate in the event and one or more parameters relating to a throttle system center operations manager ("scom").

The operations of method 800 may set a flag in a scratchpad of a power management engine ("PME") associated with the processor using a millicode routine, wherein the PME monitors the scratchpad.

The operations of method 800 may issue a throttle system center operations manager ("scom") to those of a group of processor cores required to participate in the event, wherein minimum critical path monitor ("CPM") values are stored for each of those of the group of processor cores. The operations of method 800 may increase and/or decrease the margins of the voltage, the frequency, or a combination thereof based upon comparing the stored minimum CPM values with a CPM threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing optimized margins of processors in a computing environment by a processor, comprising:

dynamically monitoring and adjusting margins of voltage, frequency, or a combination thereof for a executing a processor based a workload scheduled during an event;

setting a flag in a scratchpad of a power management engine ("PME") associated with the processor using a millicode routine, wherein the PME monitors the scratchpad;

issuing a throttle system center operations manager ("scom") to those of a group of processor cores required to participate in the event, wherein minimum critical path monitor ("CPM") values are stored for each of those of the group of processor cores; and increasing or decreasing the margins of the voltage, the frequency, or a combination thereof based upon comparing the stored minimum CPM values with a CPM threshold.

2. The method of claim 1, further including scheduling the event based on one or more configurable conditions.

3. The method of claim 1, further including performing the event as a background operation, wherein the event is a system maintenance event.

4. The method of claim 1, further including assigning the workload to one or more processor cores participating in the event.

5. The method of claim 1, further including triggering the millicode routine to execute, wherein the millicode routine indicates both those of the group of processor cores required to participate in the event and one or more parameters relating to the scom.

6. A system for providing optimized margins of processors in a computing environment, comprising:

one or more computers with executable instructions that when executed cause the system to:

dynamically monitor and adjust margins of voltage, frequency, or a combination thereof for a executing a processor based a workload scheduled during an event;

set a flag in a scratchpad of a power management engine ("PME") associated with the processor using a millicode routine, wherein the PME monitors the scratchpad;

issue a throttle system center operations manager ("scom") to those of a group of processor cores required to participate in the event, wherein minimum critical path monitor ("CPM") values are stored for each of those of the group of processor cores; and increase or decrease the margins of the voltage, the frequency, or a combination thereof based upon comparing the stored minimum CPM values with a CPM threshold.

7. The system of claim 6, wherein the executable instructions schedule the event based on one or more configurable conditions.

8. The system of claim 6, wherein the executable instructions perform the event as a background operation, wherein the event is a system maintenance event.

9. The system of claim 6, wherein the executable instructions assign the workload to one or more processor cores participating in the event.

10. The system of claim 6, wherein the executable instructions trigger the millicode routine to execute, wherein the millicode routine indicates both those of the group of processor cores required to participate in the event and one or more parameters relating to the scom.

11. A computer program product for providing optimized margins of processors in a computing environment, the computer program product comprising a non-transitory computer-readable storage medium having computer-readable program code portions stored therein, the computer-readable program code portions comprising:

an executable portion that dynamically monitors and adjusts margins of voltage, frequency, or a combination thereof for a executing a processor based a workload scheduled during an event;

an executable portion that sets a flag in a scratchpad of a power management engine ("PME") associated with the processor using a millicode routine, wherein the PME monitors the scratchpad;

an executable portion that issues a throttle system center operations manager ("scom") to those of a group of processor cores required to participate in the event, wherein minimum critical path monitor ("CPM") values are stored for each of those of the group of processor cores; and an executable portion that increases or decreases the margins of the voltage, the frequency, or a combination thereof based upon comparing the stored minimum CPM values with a CPM threshold.

12. The computer program product of claim 11, further including an executable portion that schedules the event based on one or more configurable conditions.

13. The computer program product of claim 11, further including an executable portion that performs the event as a background operation, wherein the event is a system maintenance event.

14. The computer program product of claim 11, further including an executable portion that assigns the workload to one or more processor cores participating in the event.

15. The computer program product of claim 11, further including an executable portion that:

triggers the millicode routine to execute, wherein the millicode routine indicates both those of the group of processor cores required to participate in the event and one or more parameters relating to the scom.

* * * * *

UNITED STATES PATENT AND TRADEMARK OFFICE
CERTIFICATE OF CORRECTION

PATENT NO. : 11,150,716 B2
APPLICATION NO. : 16/782386
DATED : October 19, 2021
INVENTOR(S) : Preetham M. Lobo et al.

It is certified that error appears in the above-identified patent and that said Letters Patent is hereby corrected as shown below:

On the Title Page

Inventor's name Ramon Betran Monfort should read Ramon Bertran Monfort

Signed and Sealed this
Eleventh Day of October, 2022

Katherine Kelly Vidal
*Director of the United States Patent and Trademark Office*